United States Patent [19]

Delventhal et al.

[11] Patent Number: 5,173,029
[45] Date of Patent: Dec. 22, 1992

[54] GLASS SHEET POSITIONING DEVICE

[75] Inventors: Kent A. Delventhal, Genoa, Ohio; James M. Klempner, Blissfield, Mich.

[73] Assignee: Toledo Automated Concepts, Inc., Oregon, Ohio

[21] Appl. No.: 730,488

[22] Filed: Jul. 16, 1991

[51] Int. Cl.$^5$ ............................................. B65G 47/24
[52] U.S. Cl. ................................... 414/754; 271/234; 271/253; 271/250; 198/434; 414/780; 414/781
[58] Field of Search .............. 414/754, 757, 780, 781, 414/783, 789.1; 271/234, 239, 245, 250, 253; 198/411, 434

[56] References Cited

U.S. PATENT DOCUMENTS

| | | | |
|---|---|---|---|
| 3,498,441 | 3/1970 | Furedy et al. | 198/29 |
| 3,638,564 | 2/1972 | Prange et al. | 198/434 X |
| 3,701,643 | 10/1972 | Frank | 65/62 |
| 4,058,200 | 11/1977 | Frank | 198/411 X |
| 4,127,198 | 11/1978 | Morini | 271/250 X |
| 4,200,420 | 4/1980 | Cathers et al. | 414/107 |
| 4,228,993 | 10/1980 | Cathers | 271/236 |
| 4,293,124 | 10/1981 | Bailey et al. | 271/233 |
| 4,341,299 | 7/1982 | Walker et al. | 198/434 |
| 4,452,351 | 6/1984 | Meeker | 198/434 |
| 4,477,218 | 10/1984 | Bean | 414/789.1 |
| 4,493,412 | 1/1985 | Krehnovi | 198/434 |
| 4,682,682 | 7/1987 | Hartlepp | 198/434 X |
| 4,826,421 | 5/1989 | Asano et al. | 271/253 X |
| 4,955,763 | 9/1990 | Delventhal et al. | 408/40 |
| 4,976,766 | 12/1990 | Kuster et al. | 65/289 |
| 5,028,202 | 7/1991 | Katada et al. | 414/783 |

FOREIGN PATENT DOCUMENTS 0155122 12/1981 Japan ........................... 414/789.1

Primary Examiner—Michael S. Huppert
Assistant Examiner—James Keenan
Attorney, Agent, or Firm—Thomas A. Meehan

[57] ABSTRACT

A device (10) for positioning a glass sheet or other generally rigid planar object (G), having a roller bed table (12) for supporting the object in a horizontal plane and an overhead device (14) carrying a first set of spaced apart arms (26, 28, 30, 32), each of which has a vertically acting cylinder (70) near a free end thereof, and a second set of spaced apart arms (20, 22, 24) near a free end thereof, each of which has a horizontally acting cylinder (48) near the free end thereof. Each vertically acting cylinder has a sheet edge contacting element (74) at the free end of its cylinder rod (72), and these edge contacting elements act as fixed stops during the positioning of the object. Each horizontally acting cylinder has a sheet edge contacting element (52) of the free end of its cylinder rod (50), and these edge contacting elements act as movable stops during the positioning of the object. The edge contacting elements of both the vertically acting cylinders and the horizontally acting cylinders can be retracted to positions above the sheet to permit the transferring of a sheet to, and from, the device. Each of the first arms is made up of two arm sections (60, 62) which are pivotably joined in an end-to-end manner, an inner section which is pivotably joined to the overhead device and an outer section which carries the vertically acting cylinder.

14 Claims, 5 Drawing Sheets

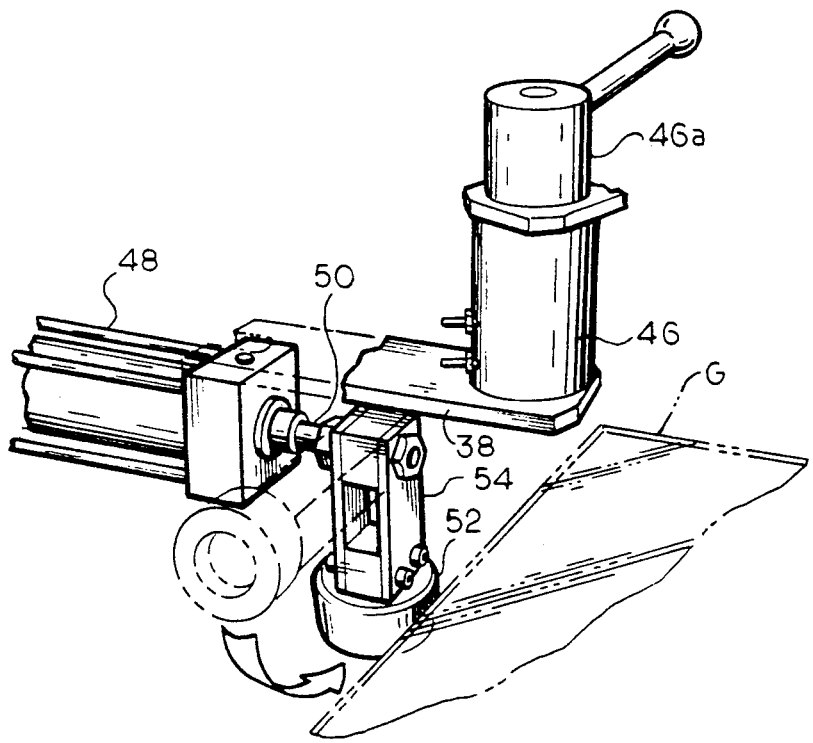
FIG. 7
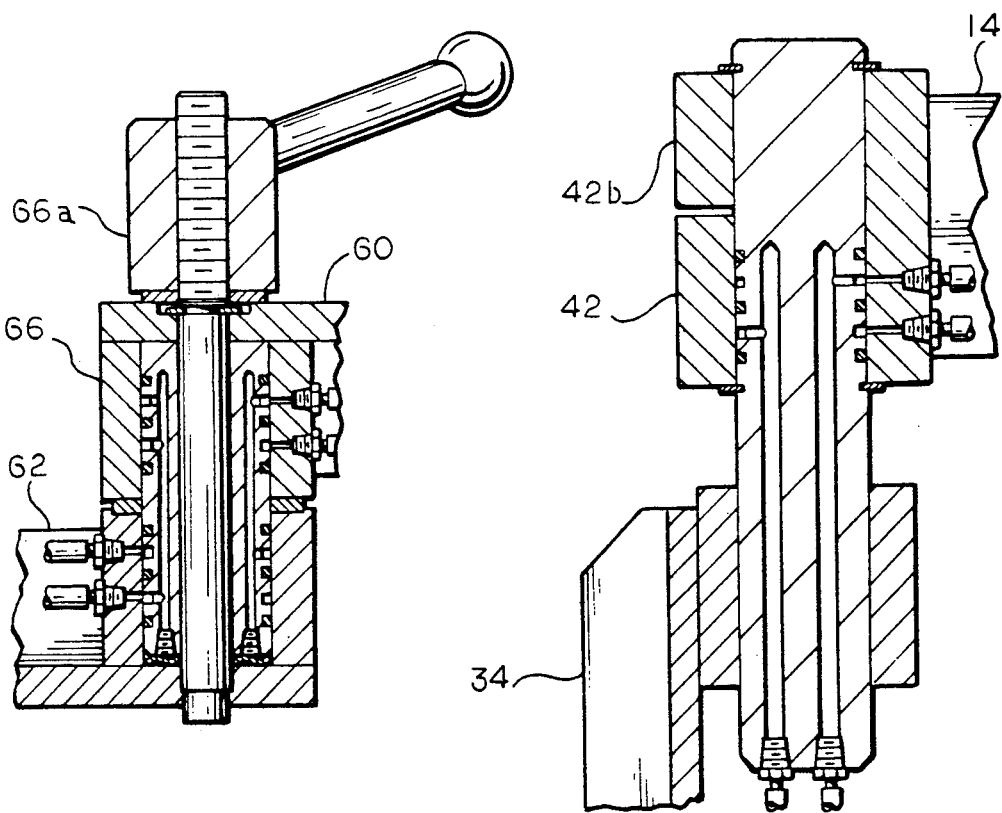
FIG. 6
FIG. 5

GLASS SHEET POSITIONING DEVICE

BACKGROUND OF THE INVENTION

1. Field Of The Invention

This invention relates to a device for precisely positioning or orienting a sheet of glass or other generally rigid planar material as a multiplicity of like sheets, in sequence, are moved from a first position to the device to be positioned or oriented by the device, and are then transferred by another device to a second position where a machining or other processing operation is to be performed thereon.

2. Description of the Prior Art

U.S. Pat. No. 4,955,763 (Delventhal and Grosjean), which is assigned to the assignee of this application, discloses a machine for drilling holes in a sheet of a generally rigid planar material, such as a glass sheet. In a typical production operation utilizing such a machine, a series of like rigid sheets, in sequence, is presented to the machine to have holes drilled therein. The rigid sheets are delivered to the machine from a source of such sheets, for example, by a conveyor or other transfer device.

During the delivery of individual sheets to a drilling machine or other machine or processing device, the sheets are subject to becoming misaligned from a desired alignment. This can be troublesome, and a misaligned sheet, when presented to a drilling machine such as that of the aforesaid '763 patent, or other machine or processing device, can wind up having holes drilled therethrough at improper locations, for example. Thus, when the accuracy of the locations of drilled holes in a finished sheet is important, or when the accuracy of the location of any other machining or processing step in a finished rigid, sheetlike article is important, each article must be precisely adjusted or oriented in its position before it is presented to the drilling machine or other machining or processing device.

The problem of adjusting the positions of sheets is even more difficult to deal with when the machine or device is to be used to process sheets of different dimensional characteristics, for example, when it is to be used to drill holes in different types or sizes of glass sheets. Under these circumstances, the sheet positioning device itself must be capable of being rapidly and accurately adjusted in its operating characteristics as the dimensional characteristics of the sheets being processed change from time to time, which is quite common in a production operation.

Certain prior artisans have recognized the desirability of providing adjustable devices for positioning or orienting rigid sheets, in sequence, during the processing of the sheets. For example, U.S. Pat. No. 4,228,993 (Cathers) discloses a vacuum actuated sheet transporting device which purports to be capable of performing an orienting step on each sheet in conjunction with the transporting step. However, the device of the Cathers patent lacks the degree of adjustability which is required in many manufacturing and processing operations.

SUMMARY OF THE INVENTION

According to the present invention there is provided a device for positioning glass sheets, or other rigid, planar sheets, as the sheets are delivered in sequence to the device from a supply thereof for presentation of the sheets from the device to a drilling machine or other processing or machining station. The transferring function which is performed in conjunction with the use of the positioning device of this invention uses an indexing shuttle which reciprocates in a linear path between a first position above an article on the positioning device, after it has been properly positioned or oriented, and a second position where a sheet from the positioning device is ready to have a manufacturing or processing operation performed thereon.

The positioning device of this invention, in a preferred embodiment, has seven (7) spaced apart locating arms around its periphery. Each locating arm extends downwardly from a fixed overhead location and has a contact element at or near its free end which contacts the workpiece along the outer edge of the workpiece. At least three (3) of the locating arms in a first set of such arms have at least three (3) joints in each of them to permit end to end sections of the arm to move relative to one another in a plane extending parallel to the sheet, usually a horizontal plane. The other locating arms have at least two (2) joints therein to permit relative movement between end to end sections of each of such arms in a plane extending parallel to the sheet, each of the arms in the second set of arms having less adjustability than the arms of the first set of arms.

The outermost of the sections in each of the arms in the first set of arms has, near its free end, a pneumatic or hydraulic cylinder whose cylinder rod, which carries the sheet contact element, can reciprocate in a plane that extends parallel to the plane of the sheet. When such cylinders are extended, the contact elements that are carried thereby engage the sheet at spaced apart locations and serve as moving stops in the positioning or orienting of the sheet. The outermost of the sections in each of the arms of the second set of arms has, near its free end, a pneumatic or hydraulic cylinder whose cylinder rod, which carries the sheet edge contact element, can reciprocate in a plane that extends transversely of the plane of the sheet. The reciprocation of the cylinder rods of the second set of arms permits the sheet edge contact elements at the ends of the arms in the second set, which also engages the sheet at spaced apart locations, and which thereby serve as fixed stops in the positioning or orienting of the sheet, to be withdrawn from the plane of the sheet at the conclusion of the positioning or orienting process, and thereby to permit the sheet to be transferred from the positioning device, and another sheet to be transferred to the positioning device, without interfering contact with the device during either transferring operation. Similarly, the contact elements of the first set of arms are capable of being oscillated in a vertical plane to avoid interference with a sheet as the sheet is being transferred into and out of the device without interfering contact with the device during either transferring operation.

Each of the joints in each of the arms has a quick release locking feature to permit rapid adjustment of the positions of the arms relative to one another, and thereby facilitate rapid resetting of the device to accommodate a change in the type or size of the sheets being handled by the device. The locking feature of the joints ensures that no maladjustment of the device will develop during the sequential processing of a multiplicity of sheets of the same kind and size, to avoid unnecessary interruptions in a production operation.

Accordingly, it is an object of the present invention to provide a device for sequentially positioning rigid, generally planar like sheets from a supply thereof to ensure proper orientation of the sheets as they are sequentially transferred from the device to another manufacturing or processing operation. More particularly, it is an object of the present invention to provide a device of the foregoing character which can be rapidly and precisely adjusted to handle planar sheets of a different size or type, to minimize downtime in a production operation when there is a change in the type or size of the sheets being processed. Even more particularly, it is an object of the present invention to provide a device of the foregoing character which is open to the transfer of a sheet into, and a properly positioned sheet from, the device without interfering contact between a sheet and the device. It is a particular object of the present invention to provide a device of the foregoing character which is suited for the handling of glass sheets in conjunction with a glass drilling machine to ensure accurate positioning of drilled holes in the sheets.

For a further understanding of the present invention and the objects thereof, attention is directed to the drawing and the following brief description thereof, to the detailed description of the preferred embodiment, and to the appended claims.

BRIEF DESCRIPTION OF THE DRAWING

FIG. 5 is a fragmentary sectional view, at an enlarged scale, taken along line 5—5 of FIG. 1;

FIG. 6 is a fragmentary sectional view, at an enlarged scale, taken along line 6—6 of FIG. 1; and FIG. 7 is a fragmentary perspective view of a portion of the structure of FIG. 3.

DETAILED DESCRIPTION OF THE PREFERRED EMBODIMENT

Figure 1:
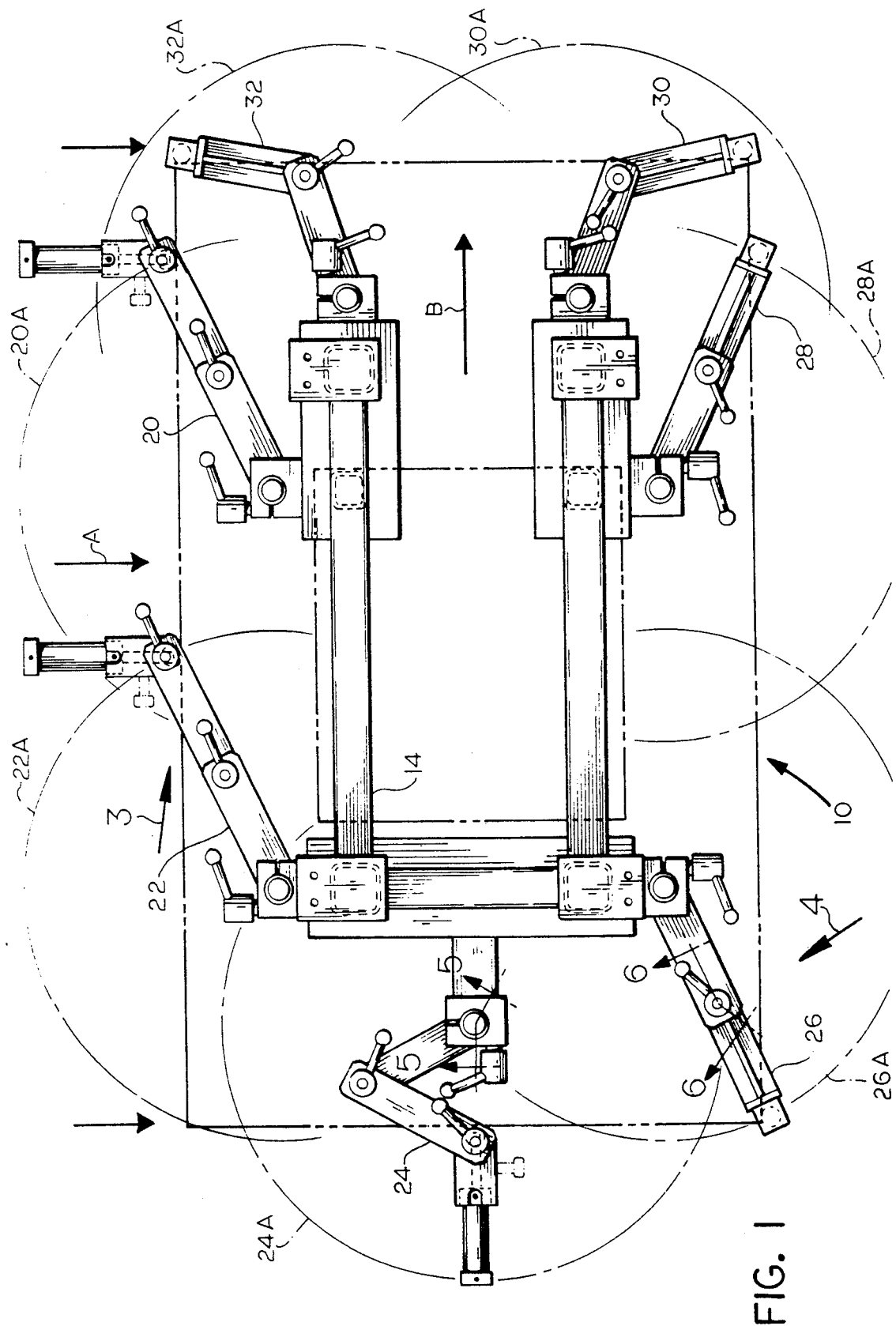
FIG. 1 is a plan view of a glass sheet positioning device according a preferred embodiment of the present invention.
Figure 2:
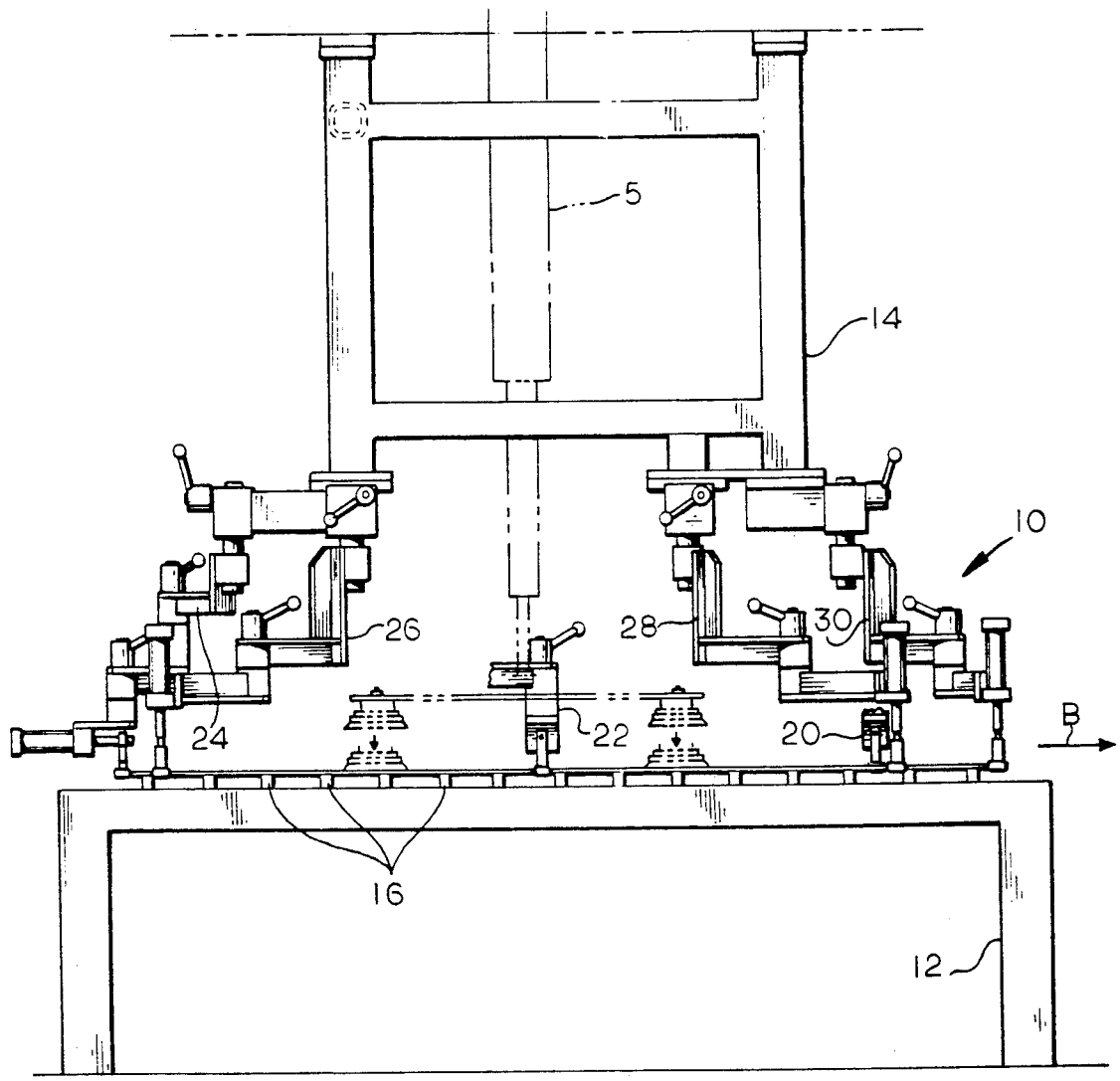
FIG. 2 is a side elevational view of the device of FIG. 1.

A glass sheet positioning device according to the present invention is indicated generally by reference numeral 10 in FIGS. 1 and 2 and includes two main units, namely a floor supported roller bed table 12 and a fixed overhead supported positioning device 14. Glass sheets, or other rigid, generally planar objects such as the maximum size sheet G1 or the minimum size sheet G2, which are shown in phantom in FIG. 1, sequentially enter the device from a source, not shown, along a flow path identified by the arrow A. The flow path A is defined by the aligned tops of a multiplicity of rollers 16 which are rotatingly mounted on the table 12, there being sufficient clearance between the device 14 and the roller bed table 12 to permit the objects to be transferred to and from the table 12. The rollers 16 are omitted from FIG. 1 for the sake of clarity, but are shown in FIG. 2.

After being properly oriented on the roller bed table 12 by the operation of the overhead device 14, as will be hereinafter explained more fully, the glass sheets or other objects are sequentially transferred from the device 10 along a flow path identified by the arrow B, the flow path B preferably extending transversely of the flow path A as illustrated in FIG. 1. The transferring operation, as illustrated, is performed by an indexing shuttle S, which is identified in phantom since it is not a part of the present invention and which reciprocates along the flow path B.

The overhead device 14 carries a first plurality of like arm units 20, 22, 24 and a second plurality of like arm units 26, 28, 30, 32. The arm 22 is specifically illustrated in FIG. 3, but it is to be understood that the arms 20, 24 are like the arm 22 in construction and function. Likewise, the arm 26 is specifically illustrated in FIG. 4, but it is to be understood that the arms 28, 30, 32 are like the arm 26. As is clear from FIG. 1, when the device 10 is being used to process objects which are generally rectangular in outline, two of the arm units 20, 22, 24, namely the arm units 20, 22, are positioned to contact an object along one of a first opposed pair of edges and the other of the arm units 20, 22, 24, namely the arm unit 24, is positioned to contact the object along one of a second opposed pair of edges, two of the arm units 26, 28, 30, 32, namely the arm units 26, 28, are positioned to contact the object along the other of the first opposed pair of edges, and one or both of the other two of the arm units 26, 28, 30, 32, namely the arm units 30 and or 32, are positioned to contact the object along the other of the second opposed pair of edges.

Figure 3:
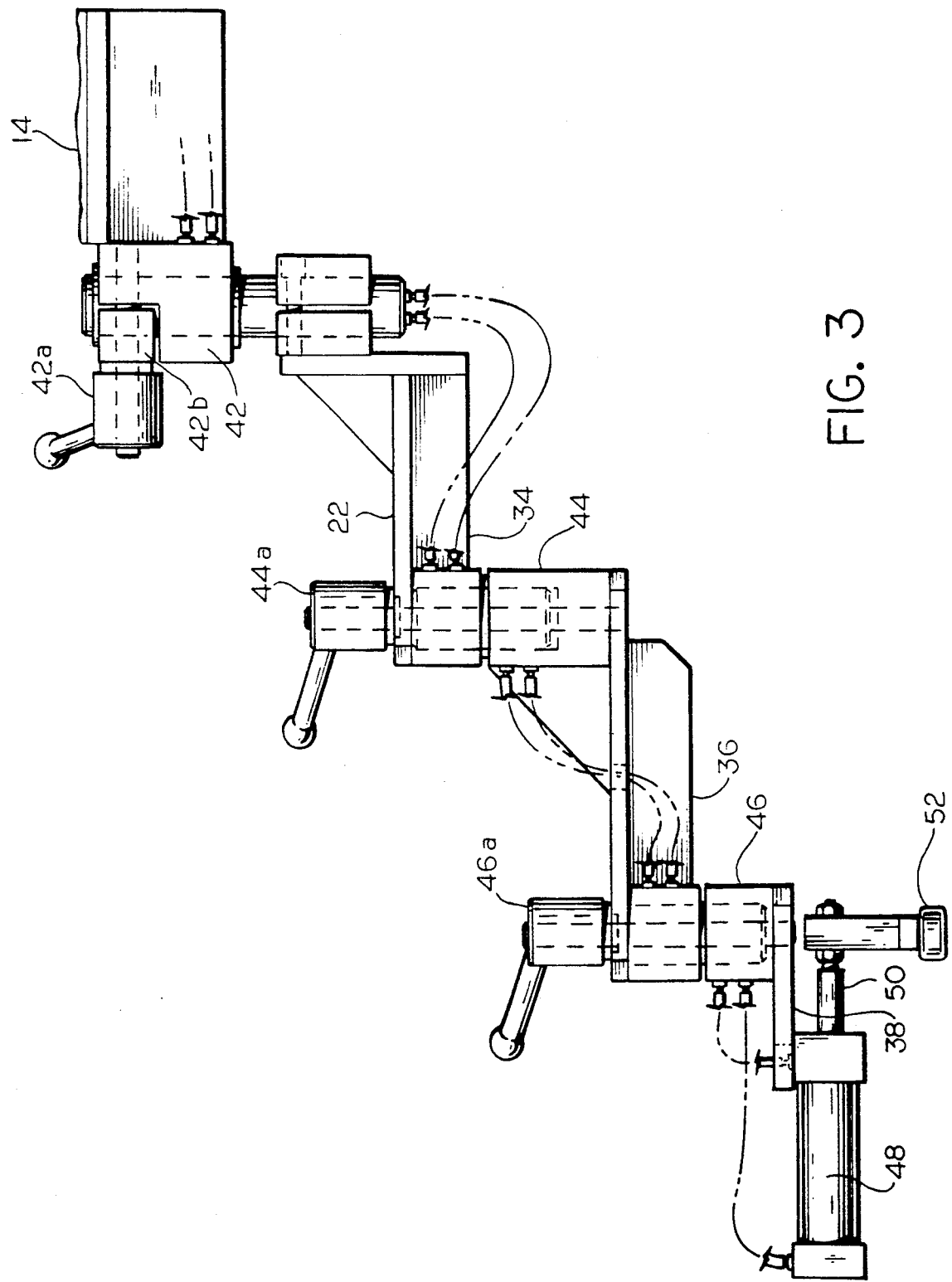
FIG. 3 is a fragmentary elevational view taken along sight line 3 of FIG. 1.

As is shown in connection with the arm 22 in FIG. 3, each of the arms 22 has three sections 34, 36, 38 arranged in an end to end fashion. A joint 42 is provided between the overhead device 14 and the innermost end of the innermost arm section 34, a joint 44 is provided between the outermost end of the arm section 34 and the innermost end of the intermediate arm section 36, and a joint 46 is provided between the innermost end of the outermost arm section 38 and the outermost end of the intermediate arm section 36. The arm section 38 carries a horizontally extending pneumatically operated cylinder 48 with a reciprocable cylinder rod 50 that carries an edge contacting element 52, such as a cam follower. The lines for the delivery of compressed air to and from the cylinder 48 extend through swivel connections in the joints 42, 44, 46, respectively as is illustrated in connection with the joint 42 in FIG. 5. Because of the joints 42, 44, 46, the arm 34 is movable in a horizontal plane relative to the device 14, the arm 36 is movable in a horizontal plane relative to the arm 34, and the arm 38 is movable in a horizontal plane relative to the arm 36. Thus, the edge contacting element 52, which is intended to contact an edge of a glass or other rigid sheet which is being processed by the device 10, in the fully extended position of the cylinder 48, can be very precisely positioned relative to the sheet. Thus, each contacting element 52 acts as a movable stop during the positioning or orienting of a sheet on the roller bed table 12, the sheet being shown in phantom in FIGS. 4 and 7 where it is identified by reference character G. The range of the positions of the elements 52 of the arms 20, 22, 24 is illustrated by the circular arcs 20A, 22A, 24A, respectively in FIG. 1.

Each of the joints 42, 44, 46, has a quick release locking feature, as is indicated by the presence of locking levers 42a, 44a, 46a, in the joints 42, 44, 46, respectively, to permit the arm sections 34, 36, 38 to be fixedly positioned once the arm 22 has been properly adjusted In that regard, the lever 42a acts on a split portion 42b, of the joint 42, in tightening or loosening the joints 42 to prevent or permit, as the case may be, relative movement of the arms joined at such joint. Thus, in operation, each of the contacting elements 52, when fully extended, will always find the same position as the device 10 is repetitively used to sequentially position like glass or other rigid sheets, while permitting rapid readjustment of the extended position of the element 52 when it is desirable to do so because of a change in the dimensional characteristics of the sheets being processed by the device 10, for example, when changing from sheets corresponding to the outline of the sheet G1 to that of the outline of sheet G2.

As is illustrated in FIGS. 3 and 7, the horizontal position of the element 52 is below that of the cylinder rod 50 of the cylinder 48. This is accomplished by attaching the element 52 directly to a link 54 which, in turn, is attached to the cylinder rod 50. The cylinder rod 50, and thus the link 54 and the contacting element 52, are adapted to swivel in a vertical plane when the cylinder rod 50 is retracted, thus elevating the contacting element 52 above the plane of the sheet G which is being processed. When the contacting element 52 is swiveled upwardly above the plane of the sheet G, there will be no interference between the contacting element 52 and the sheet G as the sheet G is being transferred into, or out of, the positioning device 10.

Figure 4:
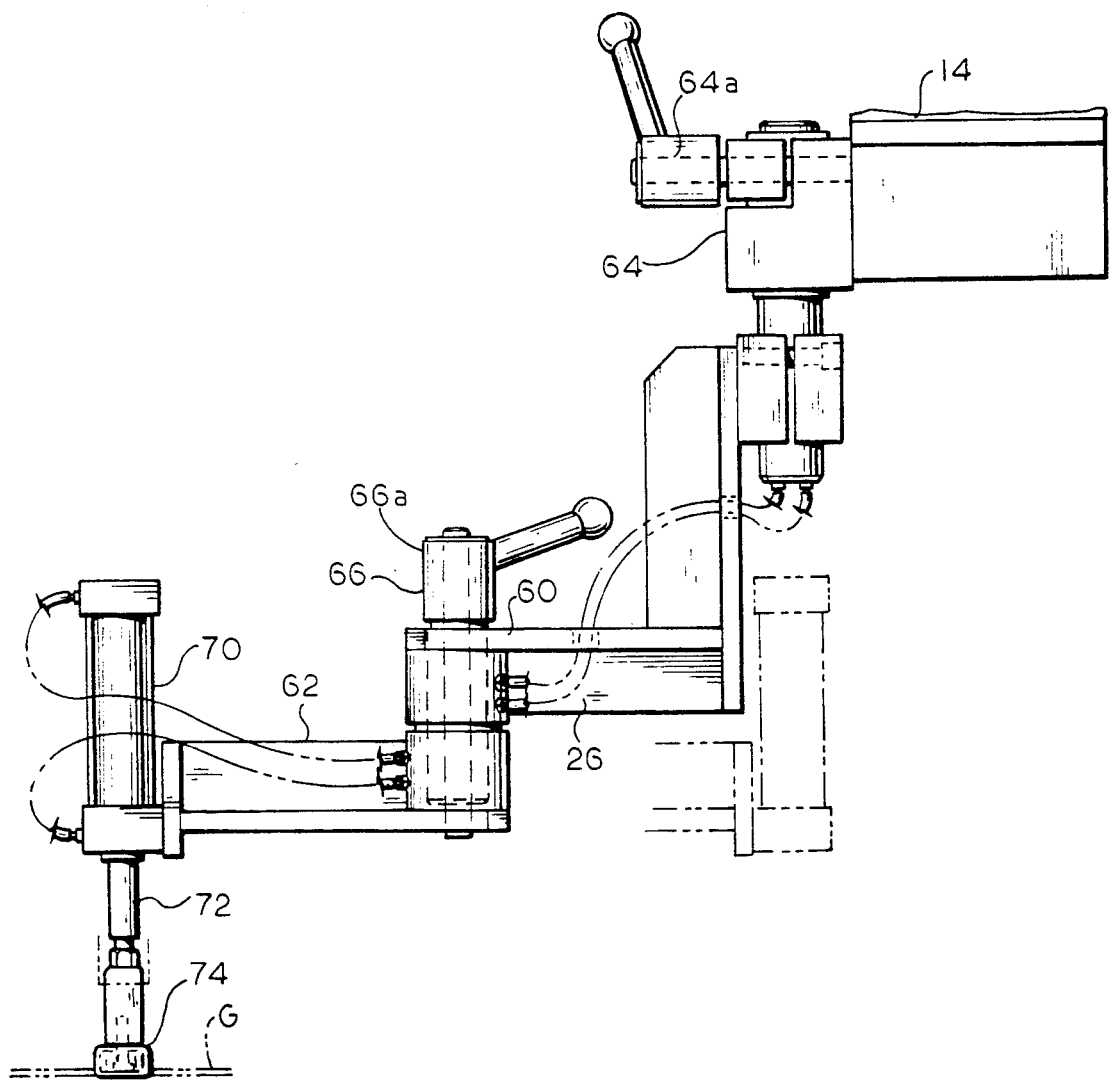
FIG. 4 is a fragmentary elevational view taken along sight line 4 of FIG. 1.

As is shown in connection with the arm 26 in FIG. 4, each of the arms 26, 28, 30, 32 has two sections 60, 62 arranged in an end-to-end fashion with a joint 64 between the overhead device 14 and the innermost end of the innermost arm section 60, and a joint 66 between the outermost end of the arm section 60 and the innermost end of the outermost arm section 62. The arm section 62 carries a pneumatically operated cylinder 70 with a cylinder rod 72 that carries an edge contacting element 74, such as a cam follower, the lines for the delivery of compressed air to and from the cylinder extending through swivel connections in the joints 64, 66 as is illustrated in connection with the joint 66 in FIG. 6. Because of the joints 64, 66, the arm section 60 is movable in a horizontal plane relative to the device 14, and the arm section 62 is movable in a horizontal plane relative to the arm section 60. Thus, the edge contacting element 74, which is intended to contact an edge of a glass or other rigid sheet in the fully extended position of the cylinder 70, can be very precisely positioned relative to the sheet G. Thus, each contacting element 74 acts as a fixed stop during the positioning or orienting of a sheet G on the roller bed table, it being noted that the cylinders 70 should be extended before the cylinders 48 are extended, to ensure that the elements 74 are in position to engage a sheet G before it is engaged by the elements 52. The innermost operating position of the cylinder 70 is indicated in phantom line in FIG. 4. The range of the positions of the elements of the arms 26, 28, 30, 32 is illustrated by the circular arcs 26A, 28A, 30A, 32A in FIG. 1.

As in the case of the joints 42, 44, 46, each of the joints 64, 66 has a quick release locking feature, as indicated by the presence of locking levers 64a, 66a in the joints 64, 66, respectively, to permit the arm sections 60, 62 to be fixedly positioned once the arm 26 has been properly adjusted. This will ensure that the contacting elements 74 will, when extended, always find the same positions as the device 10 is repetitively used to sequentially position like glass or other rigid sheets, while permitting rapid readjustment of the extended position of each of the elements 74 when it is desirable to do so because of change in the dimensional characteristics of the sheets being processed by the device 10. The vertical orientation of the cylinders 70 will ensure that the contacting elements 74, when the cylinders 70 are retracted, will be out of interfering contact with the sheet G while it is being transferred into, and out of, the device 10.

Although the best mode contemplated by the inventors for carrying out the present invention as of the filing date hereof has been shown and described herein, it will be apparent to those skilled in the art that suitable modifications, variations, and equivalents may be made without departing from the scope of the invention, such scope being limited solely by the terms of the following claims.

What is claimed is:

1. Apparatus for positioning a rigid, generally planar sheet, said apparatus comprising:
   support means for supporting the sheet in a stationary position;
   a spaced apart plurality of first stop means, each first stop means having a first contacting element for contacting an edge of the sheet and first reciprocation means for reciprocating said first containing element in a plane extending generally transversely of the sheet between a first position where said contacting element is aligned with the sheet and a second position where all of said first stop means including said first contacting element is out of alignment with the sheet, each of said first stop means being fixed in its position relative to the sheet during the positioning of the sheet, and
   a spaced apart plurality of second stop means, each second stop means having a second contacting element for contacting an edge of the sheet and second reciprocation means for reciprocating said second contacting element in a plane extending generally parallel to the sheet between a first position out of contact with each of said first contacting elements, and a second position in contact with the edge of the sheet when the edge of the sheet is in contact with each of said first contacting elements, said second reciprocating means further including means to swivel said second contacting element in a plane extending at a substantial angle with respect to the sheet to a third position out of alignment with the sheet;
   whereby a sheet can be transferred to and from said support means when each of said first contacting elements is in its second position and each of said second contacting elements is in its third position;
   wherein each of said first stop means comprises a first arm having a plurality of first arm sections joined end-to-end, each first arm section being pivotable in a plane extending generally parallel to the sheet with respect to the first arm section to which it is joined, and locking means for locking the position of each first arm section with respect to the position of the first arm section to which it is joined to prevent pivoting movement therebetween, whereby to ensure that the first position of said first contacting element will always be substantially the same until said locking means is released to permit adjustment of the position of each first arm section with respect to the position of the first arm section to which it is joined.

2. Apparatus according to claim 1 wherein each of said second stop means comprises a second arm having a plurality of second arm sections joined end-to-end, each second arm section being pivotable in a plane extending generally parallel to the sheet with respect to the second arm section to which it is joined, and second locking means for locking the position of each second arm section with respect to the second arm section to which it is joined to prevent pivoting movement therebetween, whereby to ensure that the second position of said second contacting element will always be the same until said second locking means is released to permit adjustment of the position of each second arm section with respect to the position of each second arm section to which it is joined.

3. Apparatus according to claim 1 wherein said support means extends generally horizontally, said apparatus further comprising a fixed overhead device positioned above said support means and having sufficient clearance with respect to said support means to permit a sheet to be transferred to and from said support means beneath said fixed overhead device, each of said first stop means and said second stop means being attached to said fixed device.

4. Apparatus according to claim 3 wherein each of said first stop means comprises a first arm having a plurality of first arm sections joined end-to-end, said plurality of first arm sections including an innermost first arm section which is joined at an innermost end thereof to said fixed overhead device, each first arm section being pivotable in a plane extending generally parallel to the sheet with respect to the first arm section to which it is joined, and locking means for locking the position of each first arm section with respect to the position of the first arm section to which it is joined to prevent pivoting movement therebetween, whereby to ensure that the first position of said first contacting element will always be substantially the same until said locking means is released to permit adjustment of the position of each first arm section with respect to the position of the first arm section to which it is joined.

5. Apparatus according to claim 4 wherein each of said second stop means comprises a second arm having a plurality of second arm sections joined end-to-end, said plurality of second arm sections including an inner second arm section which is joined at an inner end thereof to said fixed overhead device, each second arm section being pivotable in a plane extending generally parallel to the sheet with respect to the second arm section to which it is joined, and second locking means for locking the position of each second arm section with respect to the second arm section to which it is joined to prevent pivoting movement therebetween, whereby to ensure that the second position of said second contacting element will always be the same until said second locking mean sis released to permit adjustment of the position of each second arm section with respect to the position of the second arm section to which it is joined.

6. Apparatus according to claim 3 wherein each of said first stop means comprises a first arm having a plurality of first arm sections joined end-to-end, said plurality of first arm sections including an innermost first arm section which is joined at an innermost end thereof to said fixed overhead device, said innermost first arm section being pivotable in a plane extending generally parallel to the sheet with respect to said fixed overhead device, each first arm section being pivotable in a plane extending generally parallel to the sheet with respect to the first arm section to which it is joined, and locking means for locking the position of each first arm section with respect to the position of the first arm section to which it is joined and for locking the position of said innermost first arm section with respect to said fixed overhead device, to prevent pivoting movement between said first arm sections with respect to each other and with respect to said fixed overhead device, whereby to ensure that the first position of said first contacting element will always be substantially the same until said locking means is released to permit adjustment of the position of each first arm section with respect to the position of the first arm section to which it is joined and to permit adjustment of the position of said innermost first arm section with respect to said fixed overhead device.

7. Apparatus according to claim 6 wherein each of said plurality of second arm sections consists of three second arm sections, said innermost second arm section, an intermediate second arm section joined at an end thereof to an end of said innermost second arm section, and an outermost second arm section joined at an end thereof to another end of said intermediate second arm section, said second reciprocation means being carried by said outermost second arm section.

8. Apparatus according to claim 6 wherein each of said second stop means comprises a second arm having a plurality of second arm sections joined end-to-end, said plurality of second arm sections including an inner second arm section which is joined at an inner end thereof to said fixed overhead device, each said inner second arm section being pivotable in a plane extending generally parallel to the sheet with respect to said fixed overhead device, each said second arm section being pivotable in a plane extending generally parallel to the sheet with respect to the second arm section to which it is joined, and second locking means for locking the position of each second arm section with respect to the second arm section to which it is joined, and for locking the position of said second arm section with respect to said fixed overhead device, to prevent pivoting movement between said second arm sections with respect to each other and with respect to said fixed overhead device, whereby to ensure that the second position of said second contacting element will always be the same until said second locking means is released to permit adjustment of the position of each second arm section with respect to the position of the second arm section to which it is joined and to permit adjustment of said inner second arm section with respect to said fixed overhead device.

9. Apparatus according to claim 8 wherein each of said plurality of second arm sections consists of three second arm sections, said innermost second arm section, an intermediate second arm section joined at an end thereof to an end of said innermost second arm section, and an outermost second arm section joined at an end thereof to another end of said intermediate second arm section, said second reciprocation means being carried by said outermost second arm section, and wherein each of said plurality of first arm sections consists of two arm sections, said inner first section, and an outer first arm section, said outer first arm section being joined at an end thereof to another end of said inner first section, said first reciprocation means being carried by said outer second arm section.

10. Apparatus according to claim 9 wherein the generally rigid planar sheet is generally rectangular in outline, wherein said plurality of first stop means comprises at least four first stop means, at least a first two of said first stop means being positioned to engage the sheet along one of a first pair of opposed edges thereof, and at least a second two of said first stop means being positioned to engage the sheet along one of a second pair of opposed edges thereof.

11. Apparatus according to claim 9 wherein said plurality of second stop means comprises at least three second stop means, at least two of said second stop means being positioned to engage the sheet along another of the first pair of opposed edges thereof, and at least one of said second stop means being positioned to engage the sheet along another of the second pair of opposed edges thereof.

12. Apparatus according to claim 11 wherein the rigid, generally planar sheet is a glass sheet.

13. Apparatus according to claim 3 wherein said support means comprises a roller bed table.

14. Apparatus according to claim 1 wherein the rigid, generally planar sheet is a glass sheet.

* * * * *

UNITED STATES PATENT AND TRADEMARK OFFICE
CERTIFICATE OF CORRECTION

PATENT NO. : 5,173,029

DATED : December 22, 1992

INVENTOR(S) : Kent A. Delventhal et al.

It is certified that error appears in the above-identified patent and that said Letters Patent is hereby corrected as shown below:

IN THE CLAIMS:

Claim 1, Column 6, line 36, after "with" insert --the edge of the sheet when the edge of the sheet is in contact with--

Claim 5, Column 7, line 51, "sis" should be --is--.

Signed and Sealed this

Twenty-sixth Day of October, 1993

Attest:

BRUCE LEHMAN

Attesting Officer

Commissioner of Patents and Trademarks